United States Patent [19]
Kaneko

[11] Patent Number: 5,969,727
[45] Date of Patent: Oct. 19, 1999

[54] METHOD AND SYSTEM FOR DISPLAYING STATIC AND MOVING IMAGES ON A DISPLAY DEVICE

[75] Inventor: Satoshi Kaneko, Hyogo, Japan

[73] Assignees: Mitsubishi Electric System LSI Design Corporation, Hyogo; Mitsubishi Denki Kabushiki Kaisha, Tokyo, both of Japan

[21] Appl. No.: 08/997,258

[22] Filed: Dec. 23, 1997

[30] Foreign Application Priority Data

Jul. 24, 1997 [JP] Japan .................................. 9-198879

[51] Int. Cl.⁶ .................................................. G06F 13/00
[52] U.S. Cl. ........................................... 345/508; 348/563
[58] Field of Search ..................................... 345/141, 501, 345/520, 521, 507, 509, 192–194, 196, 516, 508; 348/552, 563, 564, 567, 569

[56] References Cited

U.S. PATENT DOCUMENTS

| | | | |
|---|---|---|---|
| 5,541,663 | 7/1996 | Ohno | 348/478 |
| 5,543,823 | 8/1996 | Kurisu | 345/196 |
| 5,623,316 | 4/1997 | Naito et al. | 348/569 |
| 5,640,172 | 6/1997 | Kim | 345/26 |
| 5,640,502 | 6/1997 | Knox et al. | 345/507 |
| 5,673,378 | 9/1997 | Chaney et al. | 345/431 |
| 5,712,663 | 1/1998 | Matsumoto | 345/195 |
| 5,774,189 | 6/1998 | Ishii et al. | 348/563 |
| 5,838,386 | 11/1998 | Kim | 348/569 |
| 5,844,623 | 12/1998 | Iwamura | 348/553 |

FOREIGN PATENT DOCUMENTS 62-258493  11/1987  Japan .

*Primary Examiner*—U. Chauhan
*Attorney, Agent, or Firm*—Leydig, Voit & Mayer, Ltd.

[57] ABSTRACT

An on-screen display unit solves a problem of a conventional on-screen display unit. The conventional unit cannot implement a moving display of an image with a small amount hardware. The novel on-screen display unit includes a first memory for storing the image code of each of images to be displayed. A second memory stores font data of the images. A latch circuit stores information indicating one of a moving display ON mode and a moving display OFF mode. A line memory stores at least one horizontal line image. An image data generating unit generates image data to be stored in the line memory. A selector selects output data from the second memory when the latch circuit stores information indicating the moving display OFF mode and selects output data from the line memory when the latch circuit stores information indicating the moving display ON mode.

8 Claims, 14 Drawing Sheets

METHOD AND SYSTEM FOR DISPLAYING STATIC AND MOVING IMAGES ON A DISPLAY DEVICE

BACKGROUND OF THE INVENTION

1. Field of the Invention

The present invention relates to a display unit for displaying characters and graphics on its screen.

2. Description of Related Art

There are roughly two methods of displaying characters and graphics on a screen: One is a character based on-screen display (abbreviated as character OSD from now on); and the other is a bitmapped on-screen display (abbreviated as bitmapped OSD from now on). Although the character OSD has a feature of achieving the character display with rather small hardware, it cannot implement moving display in which characters and graphics move from time to time, thus imposing limitations on display capability. In contrast, the bitmapped OSD has enhanced display capability, making it possible to implement the moving display such as graphics display, although it requires a large capacity display memory, and increases the scale of hardware.

FIG. 11 is a block diagram showing the configuration of a conventional character OSD unit, in which the reference numeral 1 designates a CPU for carrying out overall control of the unit; 2 designates a font ROM for storing font data; 3 designates an OSD RAM for storing character codes and the like; 4 designates a control signal generator for generating control signals required for operating respective blocks; 5 designates a main memory for storing programs for operating the CPU 1; 6 designates a latch circuit for latching the output signal of the font ROM 2 in accordance with one of the control signals generated by the control signal generator 4; 7 designates a shift register for delivering the output of the latch circuit 6 in accordance with one of the control signals generated by the control signal generator 4; and 8 designates an OSD RGB circuit for coloring data output from the shift register 7.

FIG. 12 is a block diagram illustrating details of the control signal generator 4 in FIG. 11. In FIG. 12, the reference numerals 9–24 each designate a control register for controlling each block; 25 designates a horizontal synchronizing signal pulse counter for counting pulses of a horizontal synchronizing signal H-SYNC after being reset by a vertical synchronizing signal V-SYNC; 26 designates a comparator for comparing the output value of the horizontal synchronizing signal pulse counter 25 with the outputs of the control registers 9–24 of the blocks; 27 designates a latch circuit for latching the display block number output from the comparator 26; 28 designates a frequency divider for dividing the horizontal synchronizing signal H-SYNC; 29 designates a vertical line counter for counting the divided horizontal synchronizing signal H-SYNC; and 30 designates a horizontal control signal generator for generating from a display clock signal a horizontal display character number, an OSD RAM access signal, a font ROM access signal, a shift register latch signal, a latch signal, and the like.

Next, the operation will be described.

First, setting of registers and others will be explained. In accordance with a program stored in the main memory 5, the CPU 1 first sets the control registers 9–24 of the blocks in the control signal generator 4. The control registers 9–24 store data such as vertical display start positions of respective blocks 1–16. Subsequently, the CPU 1 stores each character code of characters to be displayed at an address in the OSD RAM 3 corresponding to a desired display position (in terms of an n-th character position of an m-th block). Afterward, it starts display by setting a particular bit in the control signal generator 4 for controlling the start of the display.

Next, decision of the display start position in the vertical direction will be described. Having been reset by the vertical synchronizing signal V-SYNC, the horizontal synchronizing signal pulse counter 25 counts the pulses of the horizontal synchronizing signal H-SYNC. The comparator 26 sequentially compares the count value of the horizontal synchronizing signal pulse counter 25 with each value of the vertical display start positions stored in the control registers 9–24 every time the horizontal synchronizing signal H-SYNC is supplied, and outputs a vertical position matched signal when they agree with each other. Thus, the display block number is latched in the latch circuit 27, and the latched display block number is supplied to the OSD RAM 3.

Once the vertical display start position has been determined, the vertical position matched signal, activates the horizontal control signal, generator 30 which generates in accordance with the display clock signal the horizontal display character number, OSD RAM access signal, font ROM access signal, shift register latch signal, display clock 1, and latch signal.

The display block number stored in the latch circuit 27 and the horizontal display character number output from the horizontal control signal generator 30 are supplied to the OSD RAM 3 as its address. Thus, the OSD RAM 3 reads the character code to be displayed in response to the OSD RAM access signal. The character code is input to the font ROM 2 and serves as the address of the font ROM 2 along with the count value of the vertical line counter 29. The font ROM 2 outputs the font data in response to the font ROM access signal, and the latch circuit 6 holds the font data.

Having been reset by the vertical position matched signal, the vertical line counter 29 counts the signal generated by dividing the horizontal synchronizing signal H-SYNC by the frequency divider 28. Its dividing ratio varies depending on the vertical dimension of a display character. The shift register 7 stores the font data held in the latch circuit 6 in response to the shift register latch signal. The shift register 7 shifts the font data in serial fashion in response to the display clock signal 1 generated by dividing the original display clock signal in accordance with the horizontal character dimension. The font data output from the shift register 7 is colored by the OSD RGB circuit 8 whose color information necessary for the coloring is stored in the OSD RAM 3. Details of the color information will be omitted here because it has no direct bearing on the present invention.

FIG. 13 is a timing chart showing the operation of the conventional character OSD. As illustrated in FIG. 13, the font data fed from the font ROM 2 is latched in response to the signal indicating the horizontal display character number, and is output from the shift register 7.

FIG. 14 is a block diagram showing a bitmapped OSD unit for carrying out the OSD by writing data into a frame memory in the bitmapped fashion. In FIG. 14, the reference numeral 51 designates a CPU for controlling the overall operation of the unit; 52 designates a font ROM for storing font data; 53 designates a frame memory having a memory capacity matching the pixel numbers on a desired display screen; 54 designates a main memory for storing programs and data for operating the CPU 51; 55 designates a first in first out memory (abbreviated as FIFO from now on) for storing data output from the frame memory 53; 56 designates a color palette for converting display data to color data; and 57 designates a D/A converter for converting a digital output from the color palette 56 to an analog signal and outputs it.

Next, the operation of the conventional bitmapped OSD unit shown in FIG. 14 will be described.

The CPU 51 operates in accordance with the programs stored in the main memory 54. First, the CPU 51 reads the font data stored in the font ROM 52, processes the font data, and transfers the font data to the frame memory 53. Alternatively, the CPU 51 generates font data in accordance with the program stored in the main memory 54, and stores the font data in the frame memory 53. Since the frame memory 53 corresponds to the display screen, the CPU 51 must store the font data in addresses corresponding to their display positions on the screen when storing them in the frame memory 53. The display data set in the frame memory 53 are sequentially transferred to the FIFO memory 55 in the order to be displayed. The FIFO memory 55 shifts the data in response to the display clock signal, and transfers the data to the color palette 56 at a constant rate. The display data output from the color palette 56 is fed to the D/A converter 57 which converts the display to analog data.

It is impossible for the conventional character OSD unit as shown in FIGS. 11–13 to achieve the moving display of the characters and graphics. Although the bitmapped OSD unit as shown in FIG. 14 can achieve the moving display of the characters and graphics, it requires a large capacity frame memory. For example, it requires 25.6 kilobytes to display a text of 16 lines high by 40 characters wide, with each font data of one character consisting of 20 dots high by 16 dots wide with two colors. Thus, the frame memory occupies much of the hardware when implementing the bitmapped OSD unit in an on-chip system.

In short, it is necessary for the conventional on-screen display unit and image display method to have a large capacity frame memory to achieve the moving display of the characters and graphics because of its configuration.

SUMMARY OF THE INVENTION

The present invention is implemented to solve the foregoing problem. It is therefore an object of the present invention to provide an on-screen display unit and image display method which can implement the moving display of the characters and graphics without a large capacity frame memory.

According to a first aspect of the present invention, there is provided an on-screen display unit comprising: a first memory for storing an image code of an image to be displayed on the screen; a second memory for generating font data of an image corresponding to the image code stored in the first memory, the second memory having stored in advance font data of images to be displayed on the screen; a control signal generating circuit for generating a switching signal indicating one of a moving display ON mode and a moving display OFF mode; a line memory for storing data of at least one horizontal line image on the screen; image data generating means for generating image data to be stored in the line memory; and a selector for selecting output data of the second memory when the switching signal indicates the moving display OFF mode, and for selecting output data of the line memory when the switching signal indicates the moving display ON mode, wherein the on-screen display unit generates data to be displayed on the screen from an output of the selector.

Here, the line memory may comprise two lines corresponding to two horizontal lines on the screen, and the image data generating means may write generated data to one of the two lines alternately.

The first memory and the line memory may be integrated into one common memory.

The control signal generating circuit may generate the switching signal on a block-by-block basis, the block being determined in advance as a display area on the screen.

The control signal generating circuit may generate the switching signal on an image-by-image basis, the image being determined in advance as a display area in the block.

The control signal generating circuit may comprise an interrupt generating circuit for generating an interrupt to the image data generating means in response to a horizontal synchronizing signal produced in a predetermined area on the screen, and wherein the image data generating means, in response to the interrupt, may read display data corresponding to at least one next horizontal scanning line, process the display data, and store processed data in the line memory.

The control signal generating circuit may generate control signals for controlling the first memory, the second memory, the line memory, the image data generating means, and the selector.

According to a second aspect of the present invention, there is provided an image display method in an on-screen display unit comprising the steps of: generating an interrupt to a central processing unit in response to a horizontal synchronizing signal produced in a predetermined area on a screen; switching a selector to select an output of a line memory instead of an output of a first memory; and having, in response to the interrupt, the central processing unit read display data corresponding to the next one or more horizontal scanning lines, process the display data, and store processed data in the line memory.

DETAILED DESCRIPTION OF THE PREFERRED EMBODIMENTS

The invention will now be described with reference to the accompanying drawings.

Embodiment 1

Figure 1:
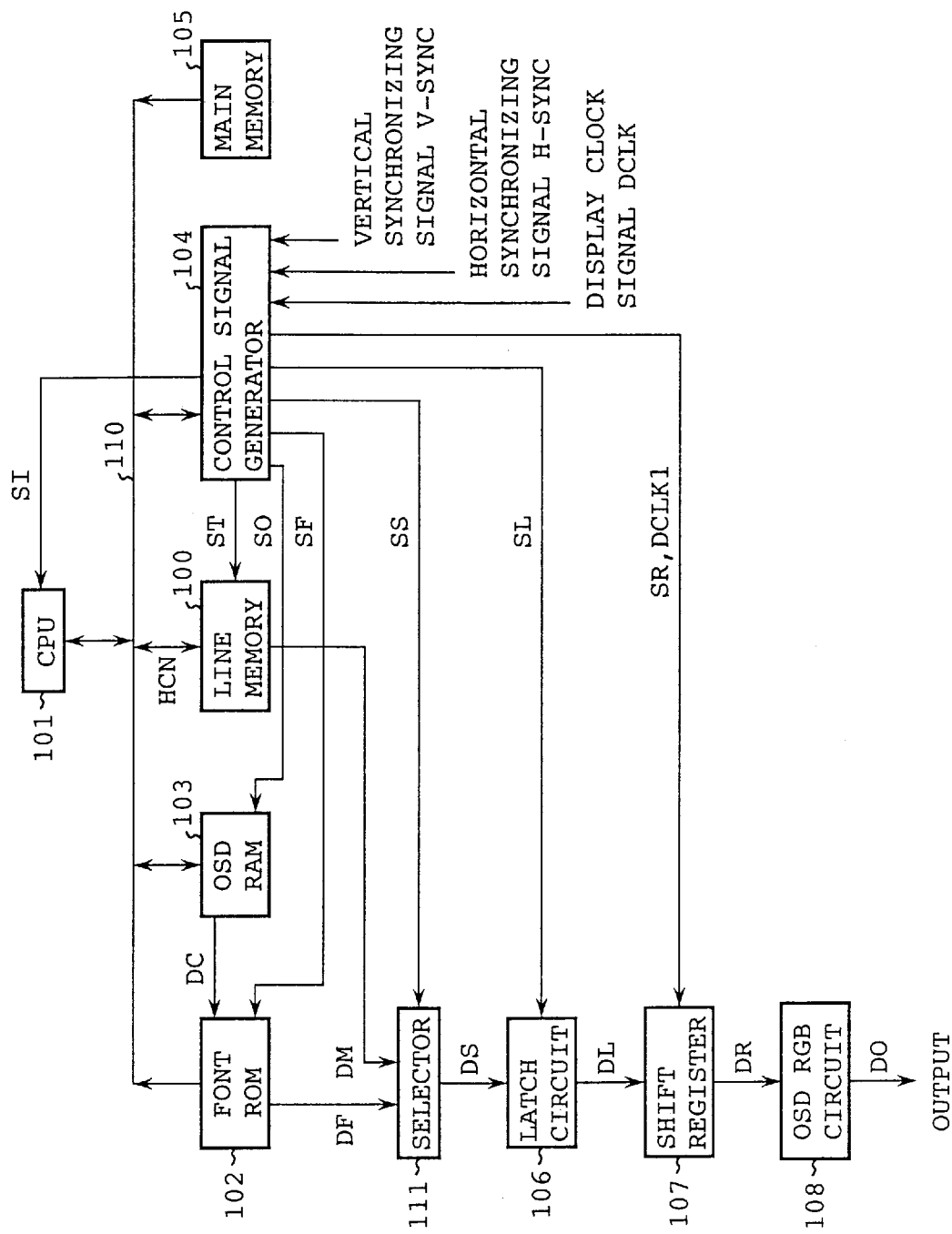
FIG. 1 is a block diagram showing a configuration of an embodiment 1 of an OSD unit in accordance with the present invention.

FIG. 1 is a block diagram showing the configuration of an embodiment 1 of an OSD unit in accordance with the present invention. In FIG. 1, the reference numeral 101 designates a CPU (central processing unit; image data generating means) for carrying out overall control of the unit; 102 designates a font ROM (second memory) for storing font data; 103 designates an OSD RAM (first memory) for storing character codes and the like; 104 designates a control signal generator for generating control signals required for operating respective blocks; 105 designates a main memory for storing programs for operating the CPU 101; 106 designates a latch circuit for latching the output signal DS of a selector 111 in response to a latch signal SL generated by the control signal generator 104; 107 designates a shift register for inputting the output DL of the latch circuit 106 in response to a shift register latch signal SR, and for outputting its content DR in serial fashion in response to the display clock signal DCLK1 fed from the control signal generator 104; and 108 designates an OSD RGB circuit for coloring the data DR output from the shift register 107.

The reference numeral 100 designates a line memory consisting of a random access memory with a memory capacity corresponding to two horizontal scanning lines of the OSD unit. Since the present embodiment 1 displays 40 characters per horizontal line with each character having a 16-dot resolution in the horizontal direction, the memory capacity of the line memory 100 is 2×40×16=1280 bits (160 bytes). The reference numeral 110 designates a data bus; and 111 designates the selector for selecting either the font data DF fed from the font ROM 102 or the data DM fed from the line memory 100 to be output. The line memory 100, having an arrangement like a dual port RAM or its equivalent, allows the CPU 101 to read or write through the data bus 110, and at the same time it can output its data DM to the selector 111. The output DS of the selector 111 is supplied to the latch circuit 106. If the speed of the CPU 101 is sufficiently high, it is enough for the line memory 100 to have a memory capacity of one line. In this case, the CPU 101 must process the data and store the data in the interval between the display of the current line and that of the next line. Alternatively, to allow an adequate margin of speed or to employ a low speed CPU for the CPU 101, a line memory with a capacity of three or more lines can be used as the line memory 100.

Figure 2:
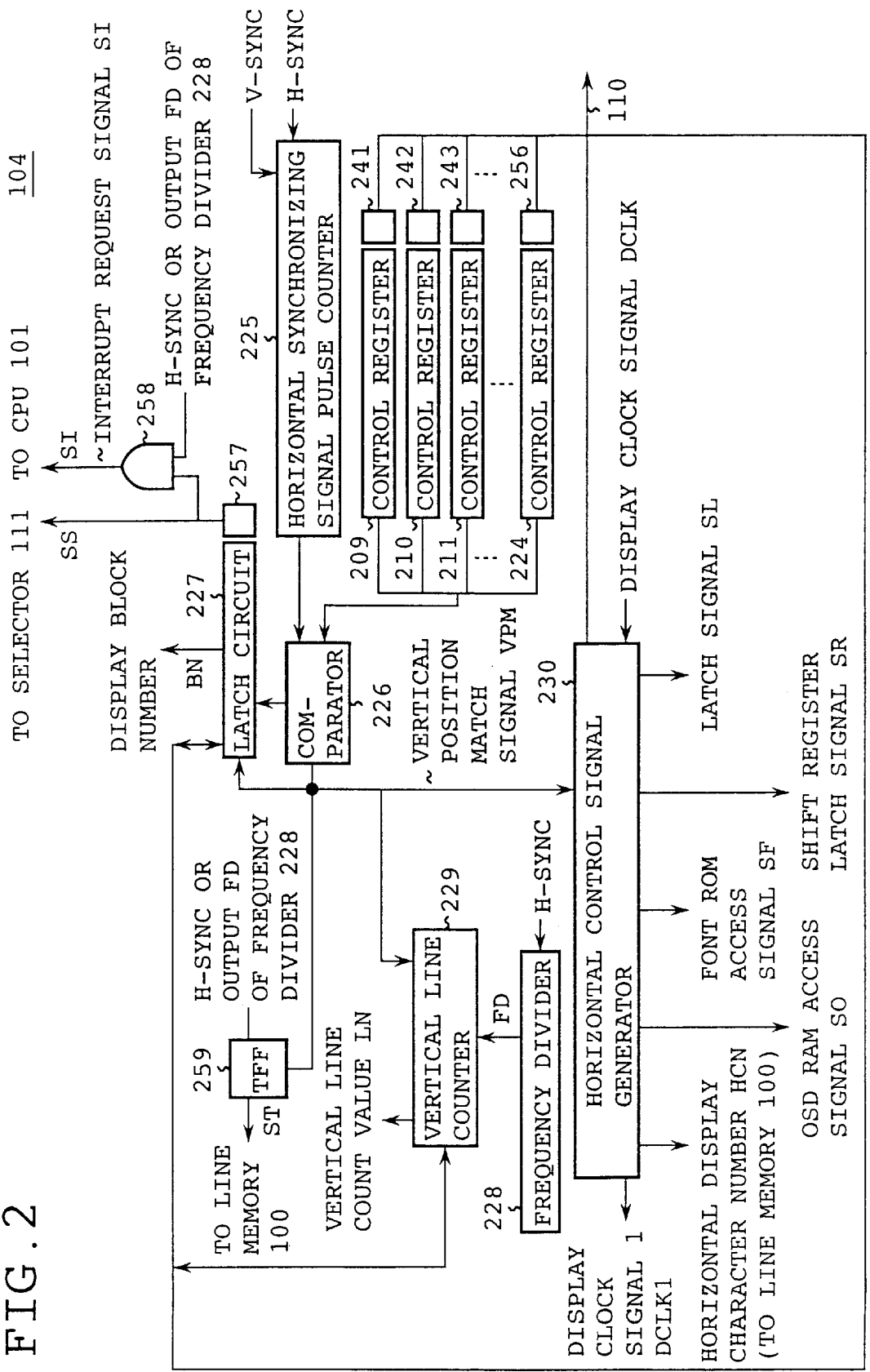
FIG. 2 is a block diagram showing a detailed configuration of a control signal generator 104 in FIG. 1.

FIG. 2 is a block diagram illustrating details of the control signal generator 104 in FIG. 1. In FIG. 2, the reference numerals 209–224 each designate a control register for controlling each block; 225 designates a horizontal synchronizing signal pulse counter for counting the horizontal synchronizing signal H-SYNC after being reset by the vertical synchronizing signal V-SYNC; 226 designates a comparator for comparing the output value of the horizontal synchronizing signal pulse counter 225 with the output of each of the control registers 209–224 of the blocks; 227 designates a latch circuit for latching the block number output from the comparator 226; 228 designates a frequency divider for dividing the horizontal synchronizing signal H-SYNC; 229 designates a vertical line counter for counting the divided horizontal synchronizing signal H-SYNC after being reset by the vertical position matched signal VPM; and 230 designates a horizontal control signal generator for generating from a display clock signal DCLK a horizontal display character number HCN, an OSD RAM access signal SO, a font ROM access signal SF, a shift register latch signal SR, a latch signal SL, and a display clock signal DCLK1.

Furthermore in FIG. 2, the reference numerals 241–256 each designate a latch circuit for holding a moving display ON/OFF bit added to the data in the control registers 209–224 corresponding to the blocks 1–16. The reference numeral 257 designates a 1-bit latch circuit added to the latch circuit 227 for latching the current moving display ON/OFF bit, and 258 designates an AND circuit for ANDing the output of the latch circuit 257 and one of the horizontal synchronizing signal H-SYNC and the output FD of the frequency divider 228. The output of the AND circuit 258 is supplied to the CPU 101 as an interrupt signal. The reference numeral 259 designates a toggle flip-flop which is reset by the vertical position matched signal VPM, and inverts its output each time its clock input, that is, one of the horizontal synchronizing signal H-SYNC and the output FD of the frequency divider 228 is applied thereto. The output of the toggle flip-flop 259 is supplied to the line memory 100 so that one of its two lines is selected. The latch circuit 227 holding the display block number BN and the vertical line counter 229 for counting the vertical line number LN (see, FIG. 3) in the font ROM 102 are each connected to the data bus 110 so that these values BN and LN can be read out by the CPU 101. The output ST of the toggle flip-flop 259 and the horizontal display character number HCN output from the horizontal control signal generator 230 is fed to the line memory 100 so that they function as an address of the line memory 100 when reading data therefrom and supplies the data to the selector 111. Although address data is supplied from the CPU 101 to the line memory 100 when the CPU 101 accesses the line memory 100, it is not shown in FIG. 1. The value SS held in the latch circuit 257 is transferred to the selector 111, and the output SI of the AND circuit 258 is sent to the CPU 101.

Next, the operation will be described.

Figure 3:
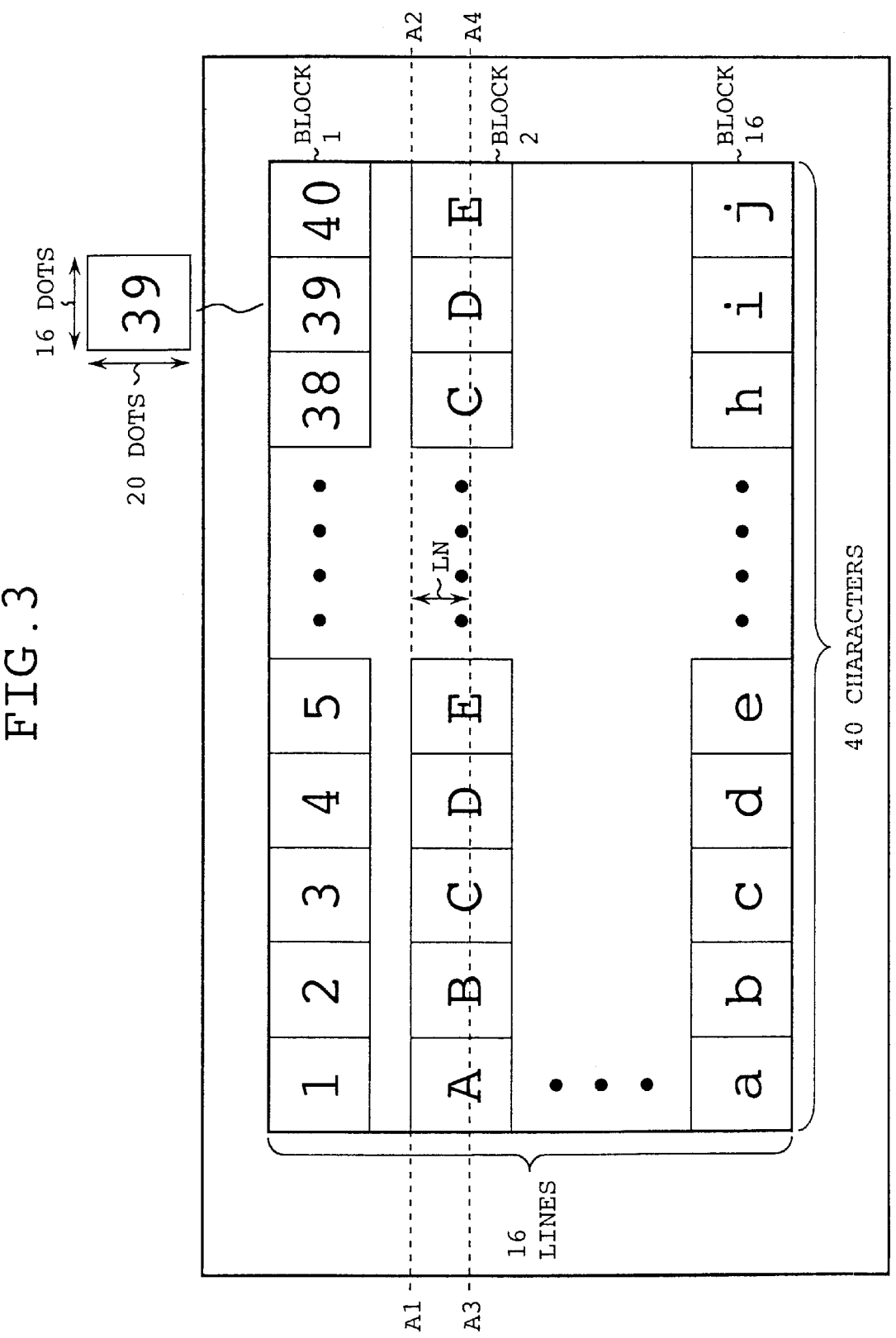
FIG. 3 is a diagram illustrating relationships between a display screen and an on-screen display in the embodiment 1.

FIG. 3 is a diagram illustrating the relationship between a display screen and an on-screen display. As illustrated in this figure, the on-screen display consists of 40 characters per line by 16 lines, with each of the blocks 1–16 displayed for each one of the horizontal lines. Each character or graphic is 16 dots wide by 20 dots high as illustrated by the character "39", the second one from the right in the block 1.

First, a still display mode will be described in which moving display of graphics or the like is not carried out. The vertical display start position is initially set in the control registers 209–224 of the blocks. In addition, zeros indicative of a moving display OFF mode are set in the latch circuits 241–256. The setting of the remaining portions such as the OSD RAM 103 are the same as those of the OSD RAM 3 and others in FIG. 10.

Setting of the registers will be described. In accordance with the program stored in the main memory 105, the CPU 101 sets data in the control registers 209–224 of the blocks of the control signal generator 104 so that the control registers 209–224 store data such as vertical display start positions and the like of respective blocks 1–16. Subsequently, the CPU 101 stores the character code of each character to be displayed at the address of the OSD RAM 103 corresponding to a desired display position (in terms of an n-th character position in the horizontal direction in an m-th block). Afterward, it starts display by setting a particular bit (not shown FIGS. 1 and 2) in the control signal generator 104 for controlling the start of the display.

Next, determination of the display start position in the vertical direction will be described. Having been reset by the vertical synchronizing signal V-SYNC, the horizontal synchronizing signal pulse counter 225 counts the pulses of the horizontal synchronizing signal H-SYNC. The comparator 226 sequentially compares the count value of the horizontal synchronizing signal pulse counter 225 with the values of the vertical display start positions stored in the control registers 209–224 every time the horizontal synchronizing signal H-SYNC is supplied, and outputs a vertical position matched signal VPM when they agree with each other. Thus, the display block number BN is latched in the latch circuit 227, and the latched number BN is input to the OSD RAM 103.

In response to the vertical position matched signal VPM, the latch circuit 227 for storing the display block number stores the block number BN of the matched vertical display start position, and the latch circuit 257 stores the value of the moving display ON/OFF bit of the control register of the block corresponding to the matched vertical display start position. Since the latch circuits 241–256 of the entire blocks store "0" at present, the latch circuit 257 is set at "0". Therefore, no interrupt signal SI is output from the AND circuit 258 in FIG. 2. Incidentally, the interrupt is edge-sensed.

Figure 11:
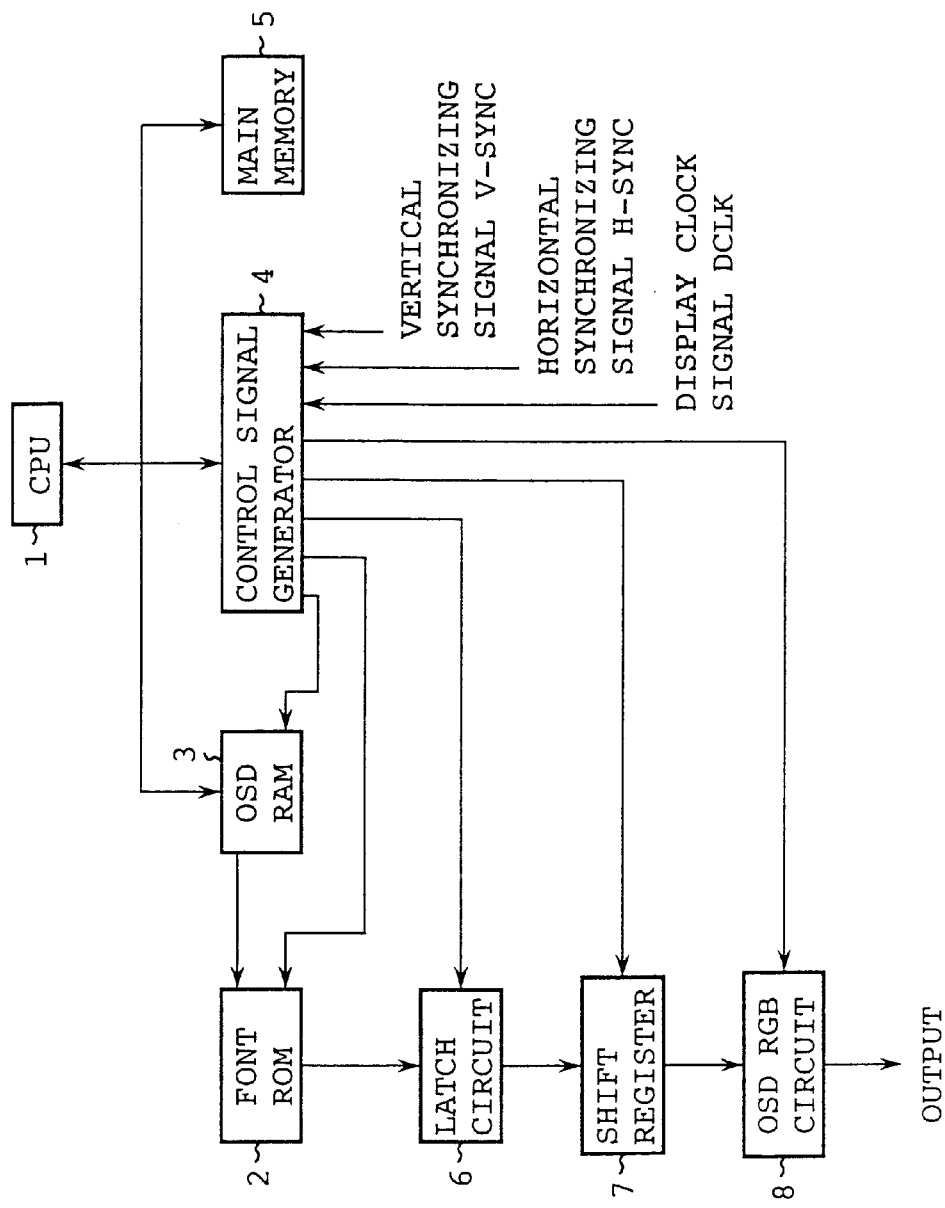
FIG. 11 is a block diagram showing a configuration of a conventional character OSD unit.
Figure 12:
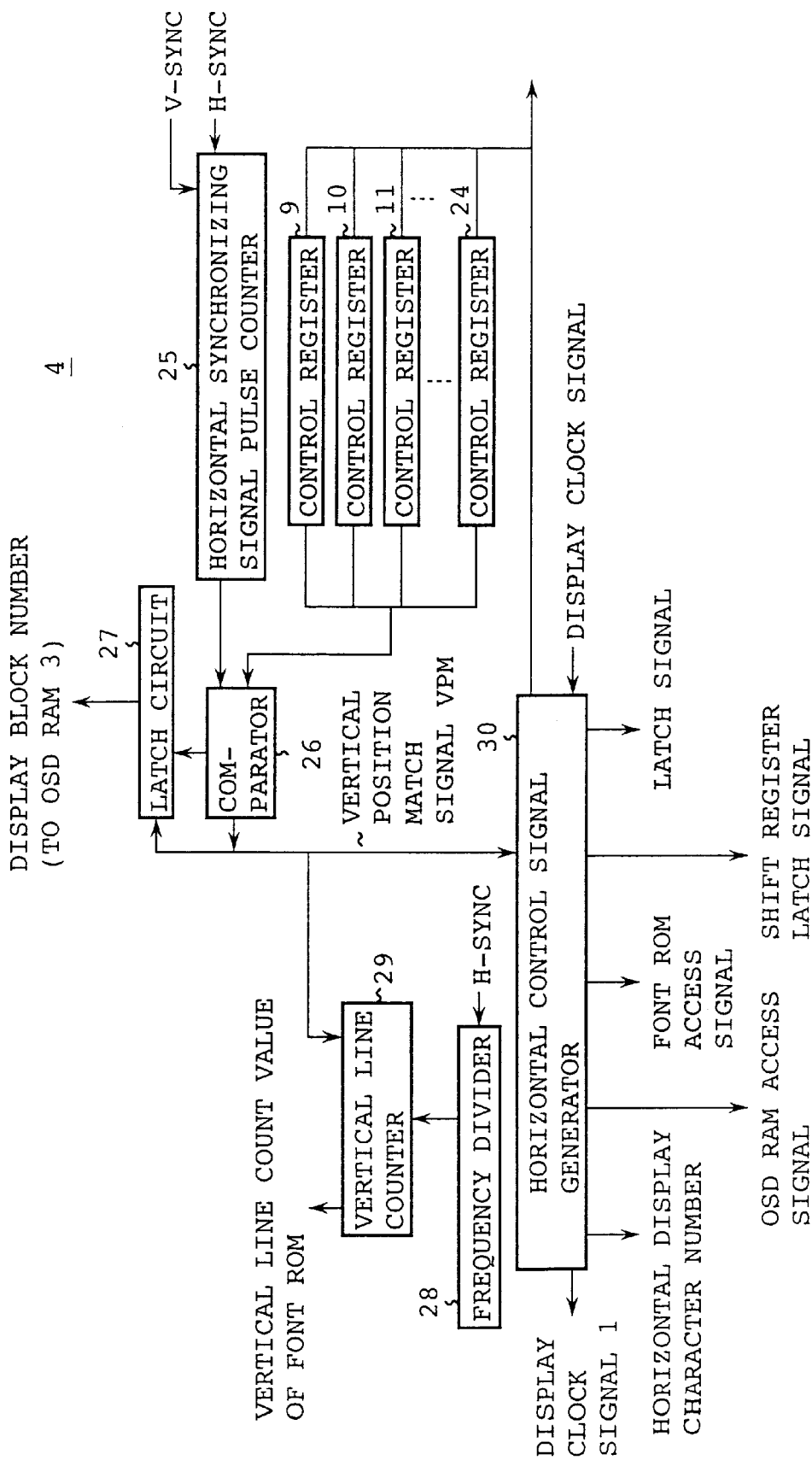
FIG. 12 is a block diagram showing a detailed configuration of a control signal generator 4 in FIG. 11.
Figure 13:
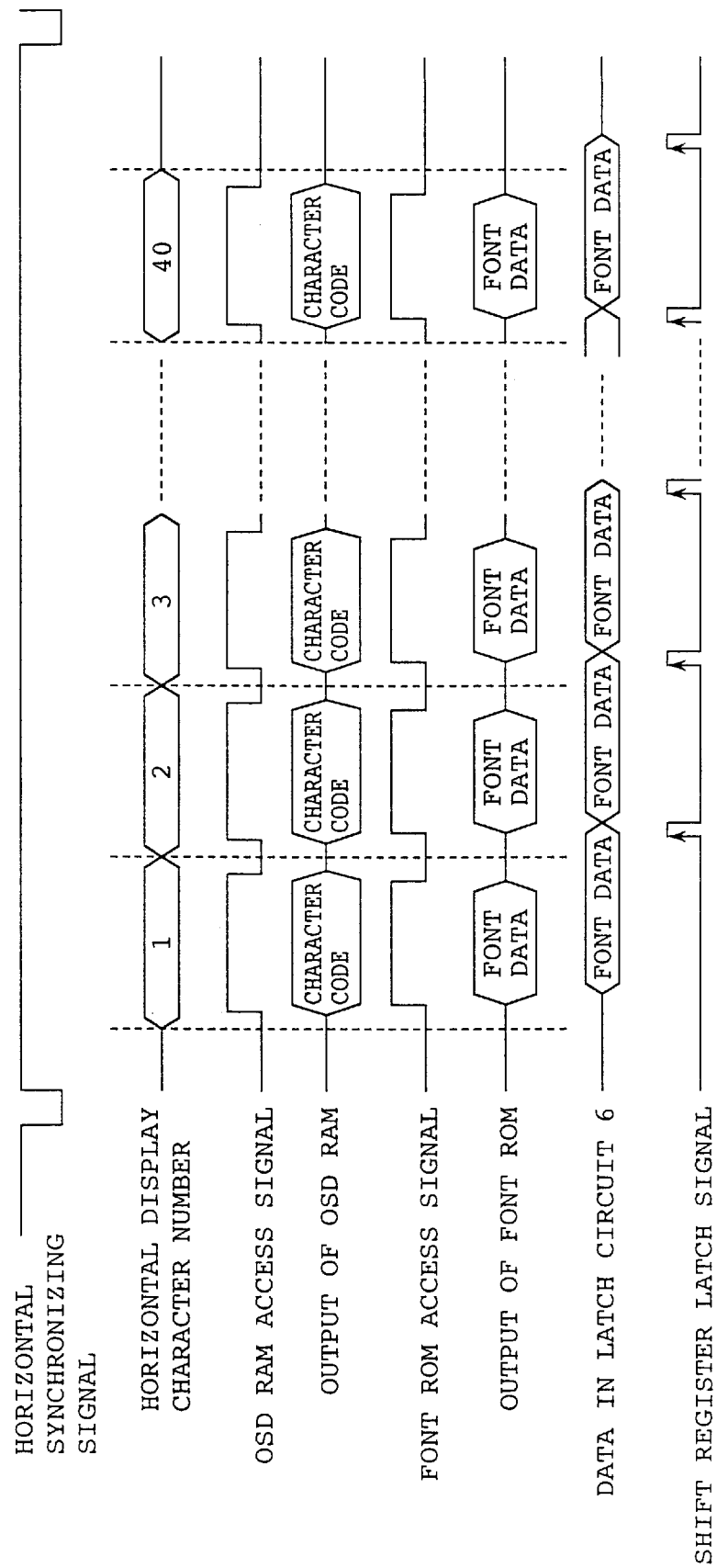
FIG. 13 is a timing chart illustrating the operation of the conventional character OSD unit.

The value "0" stored in the latch circuit 257 indicative of the moving display OFF mode is fed to the selector 111 in FIG. 1. When the value of the latch circuit 257 is "0", the selector 111 supplies the latch circuit 106 with the output DF of the font ROM 102. Accordingly, the configuration of FIG. 1 becomes equivalent to the conventional configuration described in connection with FIG. 11. Thus, the operation of the latch circuit 106, shift register 107 and OSD RGB circuit 108 is the same as that of the latch circuit 6, shift register 7 and OSD RGB circuit 8 described before.

Figure 4:
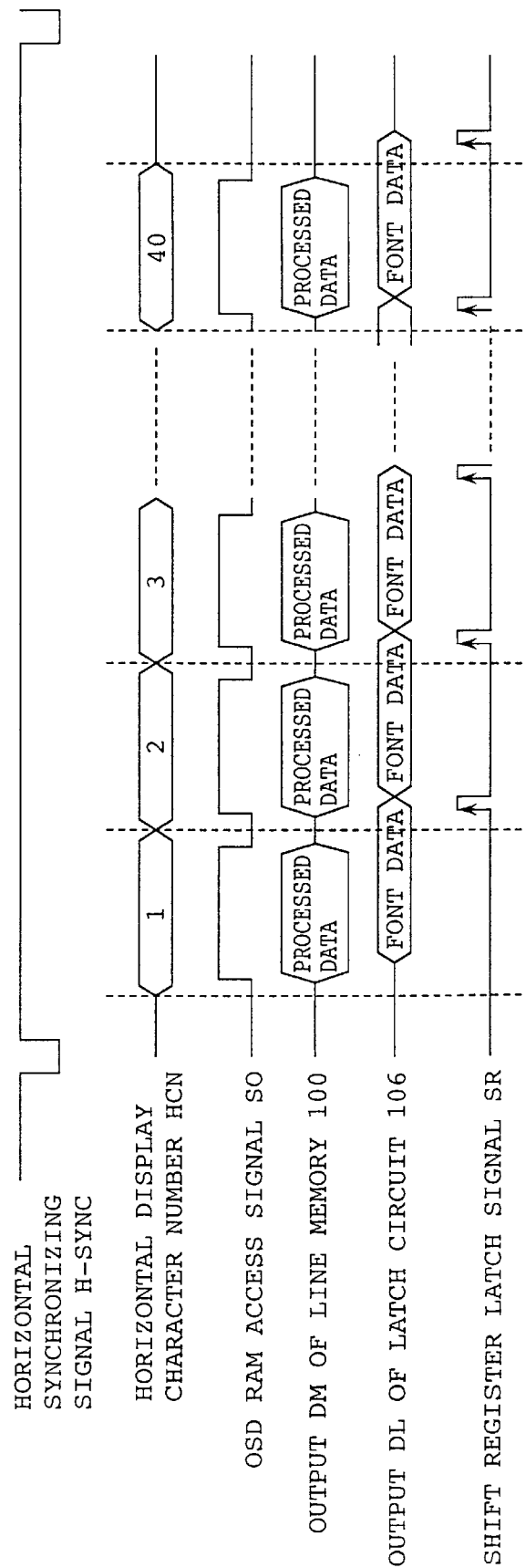
FIG. 4 is a timing chart showing signals of various portions to illustrate the operation of the moving display in the embodiment 1.
Figure 5:
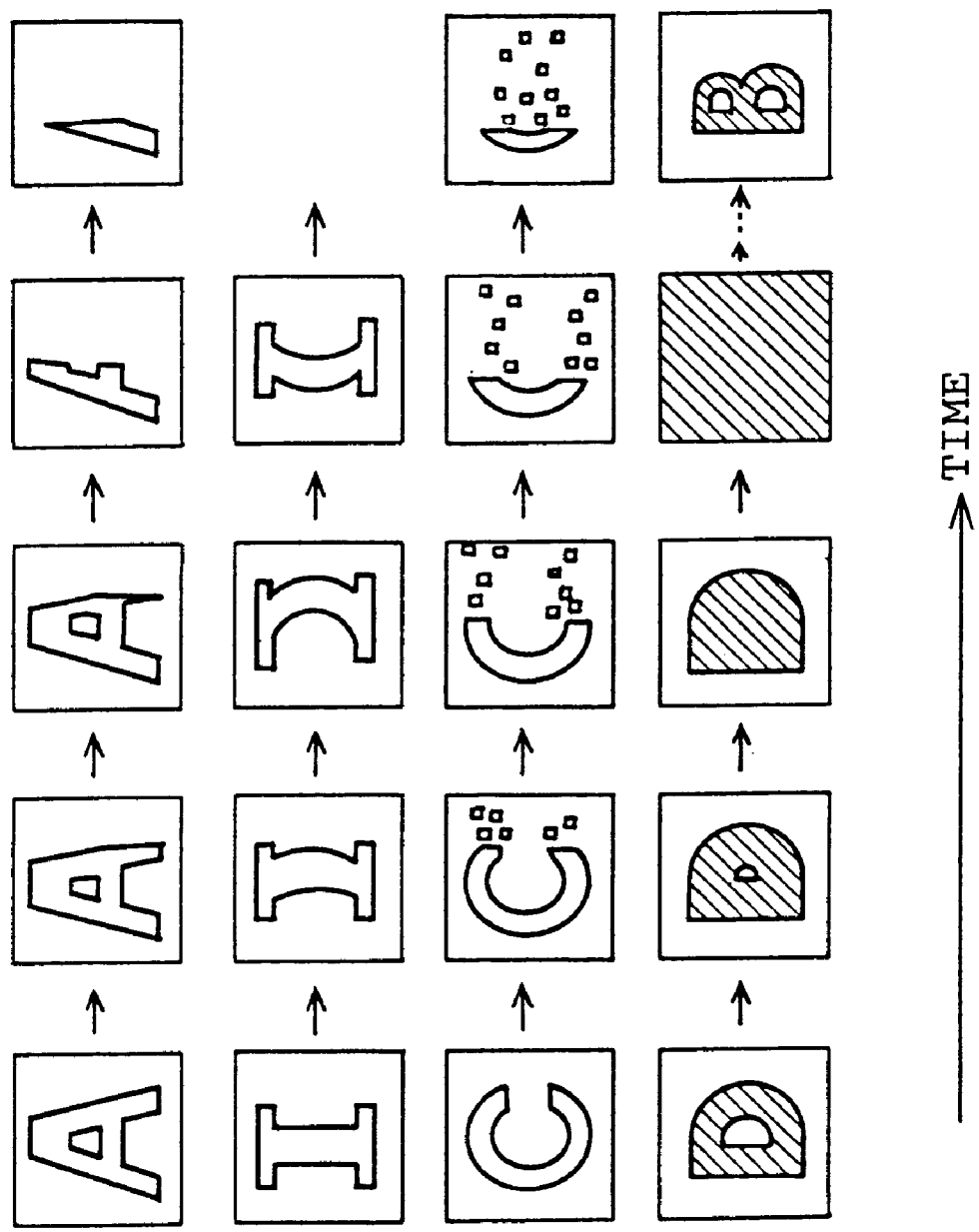
FIGS. 5A–5D are diagrams illustrating examples of the moving display in the embodiment 1.

Next, the moving display mode of the present embodiment 1 will be described. FIG. 4 is a timing chart showing signals of various portions for illustrating the operation in the moving display mode, and FIGS. 5A–5D illustrate examples of the moving display in accordance with the present invention. As illustrated in FIGS. 5A–5D, the configurations of characters or graphics change with time in the moving display mode. Having set the vertical display start positions in the control registers 209–224 of all the blocks, the CPU 101 sets "1" indicative of the moving display ON mode in the latch circuits 241–256 associated with the control registers 209–224 of the blocks. Since the remaining setting of the OSD RAM 103 is the same as that in the still display mode, the description thereof is omitted here.

Since the operation in the moving display mode is similar to that in the still display mode described above up to the generation of the vertical position matched signal VPM by the comparator 226, description of the operation up to that point will be omitted here. In response to the vertical position matched signal VPM, the latch circuit 227 for holding the display block number stores the block number BN of the matched vertical display start position, and the latch circuit 257 stores the moving display ON/OFF bit of the control register of the block associated with the matched vertical display start position.

Figure 6:
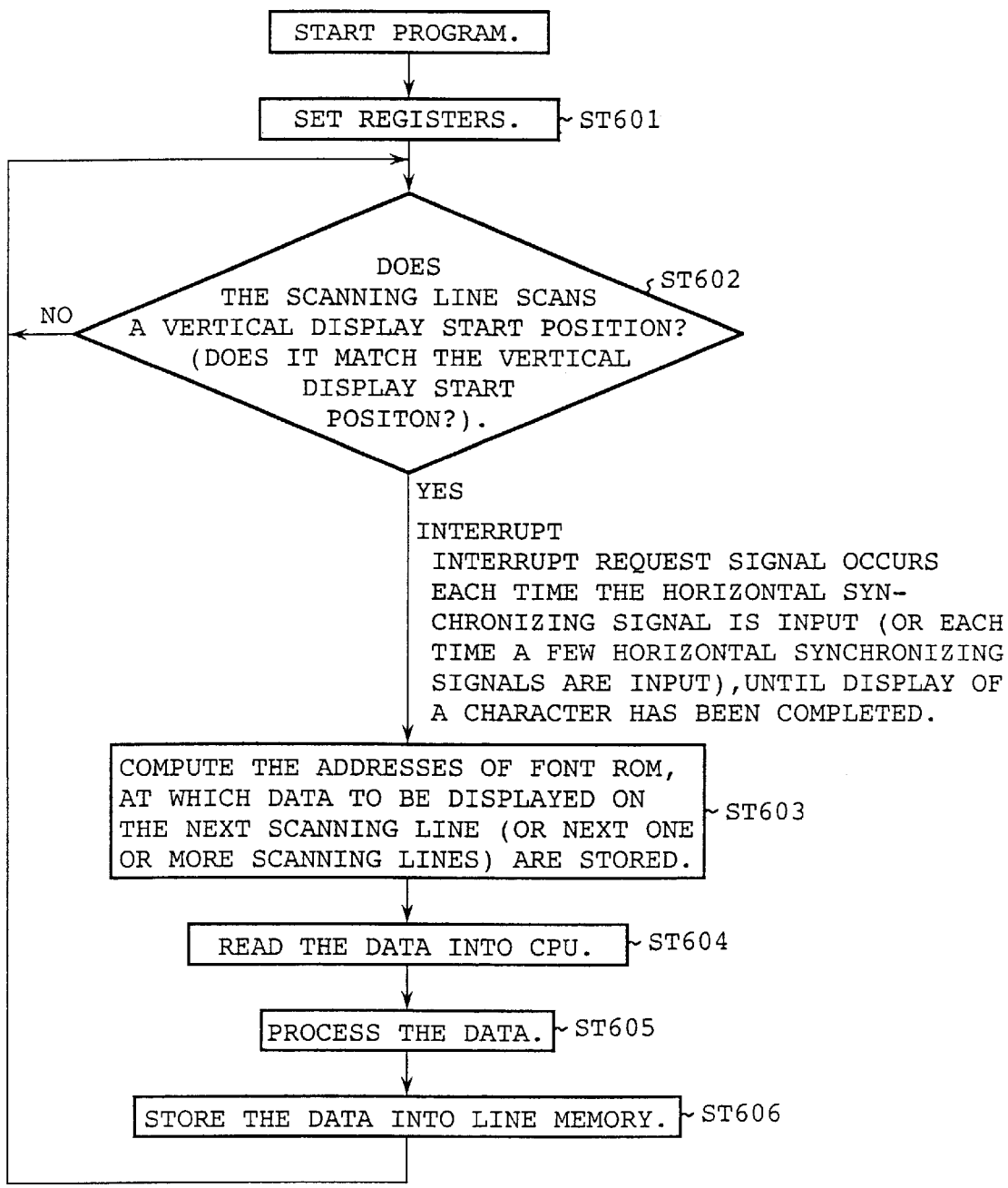
FIG. 6 is a flowchart illustrating the operation of an interrupt handler in the embodiment 1.

While the latch circuit 257 holds "1", the AND circuit 258 generates the interrupt request signal every time the horizontal synchronizing signal H-SYNC occurs. The interrupt request signal is fed to the CPU 101, causing it to execute the interrupt handler. FIG. 6 is a flowchart showing the procedure of the interrupt handler. As illustrated in FIG. 6, having set the values in the registers at step ST601, the CPU 101 makes a decision whether the scanning line scans one of the vertical display start positions, that is, whether the scanning line matches it at step ST602. If the decision result is positive, the CPU 101 reads from the latch circuit 227 the current block number BN, and identifies from the block number BN the character codes to be subjected to the moving display. In addition, the CPU 101 reads from the vertical line counter 229 the vertical line number LN in the font ROM 102 of the current display character (see, FIG. 3). Then, on the basis of these values, the CPU 101 computes the addresses in the font ROM 102 of the data to be displayed in the next line at step ST603, reads the data from the font ROM 102 at step ST604, and processes the data at step ST605. Subsequently, the CPU 101 stores at step ST606 the processed data at the position in the line memory 100 corresponding to the position to be displayed on the next line, and exits the interrupt routine.

Figure 7:
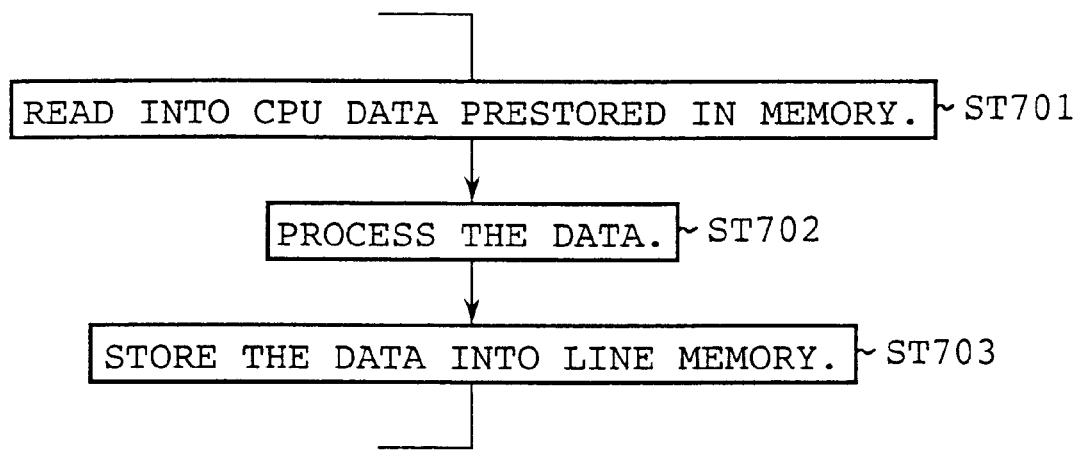
FIG. 7 is a flowchart illustrating part of the operation of another interrupt handler in the embodiment 1.

The foregoing steps ST603–ST606 in FIG. 6 can be replaced by steps ST701–ST703 as shown in FIG. 7. In this case, the CPU 101 reads in the interrupt routine the data prestored in its memory at step ST701, processes the data at step ST702, and stores the processed data in the line memory 100 at step ST703.

Next, the switching of the selector 111 will be described. The latch circuit 257 provides the selector 111 with the signal SS with a value "1". Then, the selector 111 selects the output DM of the line memory 100. Thus, the data DM is supplied from the line memory 100 to the latch circuit 106 as long as the latch circuit 257 holds the moving display ON/OFF bit of "1".

In response to the OSD RAM access signal SO, the line memory 100 supplies the selector 111 with its content stored at the address designated by the signal ST the toggle flip-flop 259 outputs and the horizontal display character number HCN the horizontal control signal generator 230 outputs. Thus, the moving display can be implemented.

The foregoing configuration enables the moving display of the characters and graphics at desired areas on the display screen to be implemented with a display memory (line memory) with a capacity smaller than that of the bitmapped OSD. For example, when displaying an image with 16 lines high by 40 characters wide, with each character consisting of 20 dots by 16 dots, the capacity of the line memory 100 becomes 2×40×16=1280 bits, which is reduced by a factor of 160 as compared with the capacity of 25.6 kilobytes required by the frame memory of the bitmapped OSD under the same conditions. In addition, since the present display unit operates as the character OSD in the moving display OFF mode, it has an advantage of preventing unnecessary load from being imposed on the CPU 101.

Embodiment 2

Figure 8:
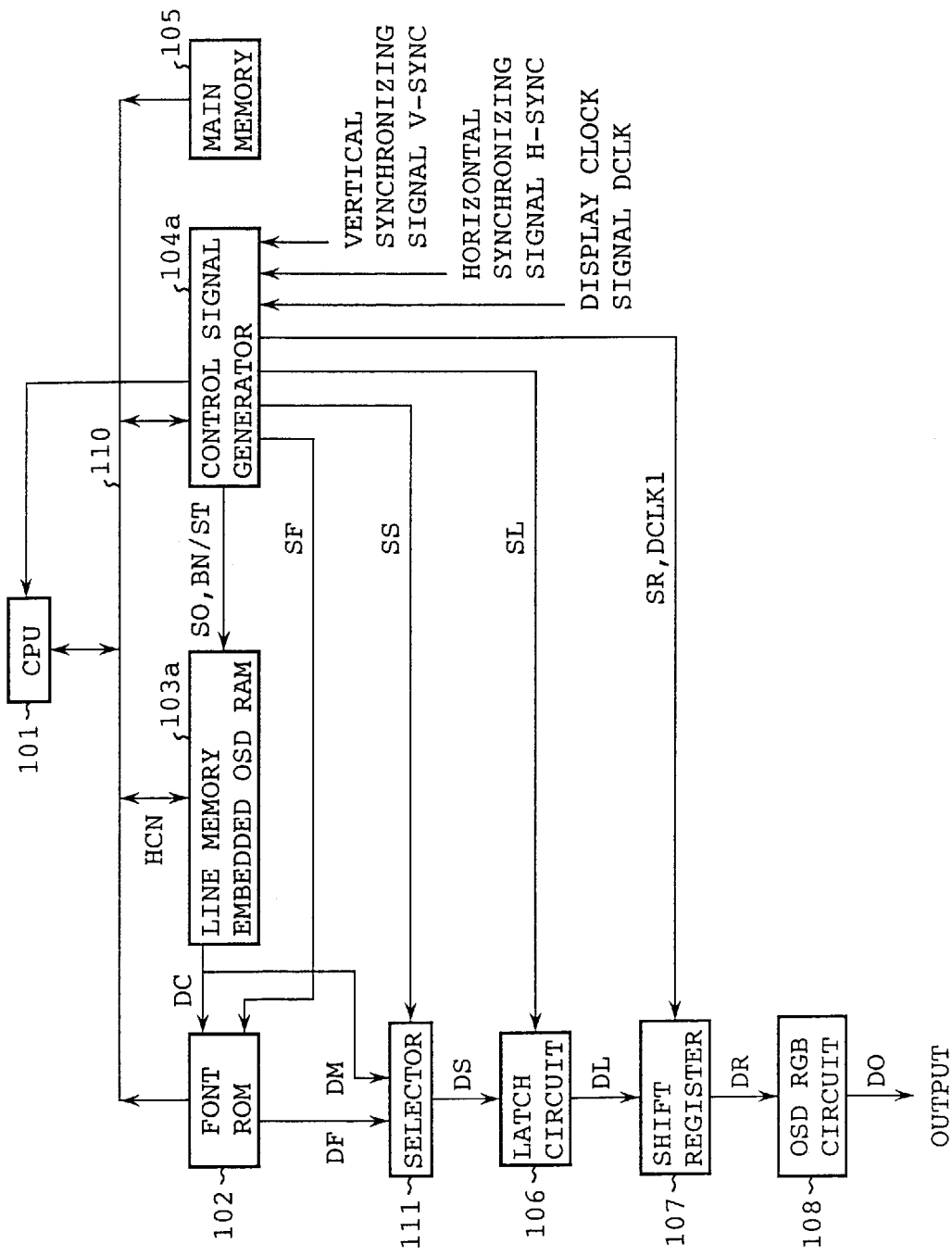
FIG. 8 is a block diagram showing a configuration of an embodiment 2 of the OSD unit in accordance with the present invention.

FIG. 8 is a block diagram showing an embodiment 2 of the OSD unit in accordance with the present invention, in which the reference numeral 103a designates a line memory embedded OSD RAM (common memory) into which a line memory is integrated, and 104a designates a control signal generator for generating control signals needed for processing the blocks. In FIG. 8, like portions to those of FIG. 1 are designated by the same reference numerals and the description thereof is omitted here.

Figure 9:
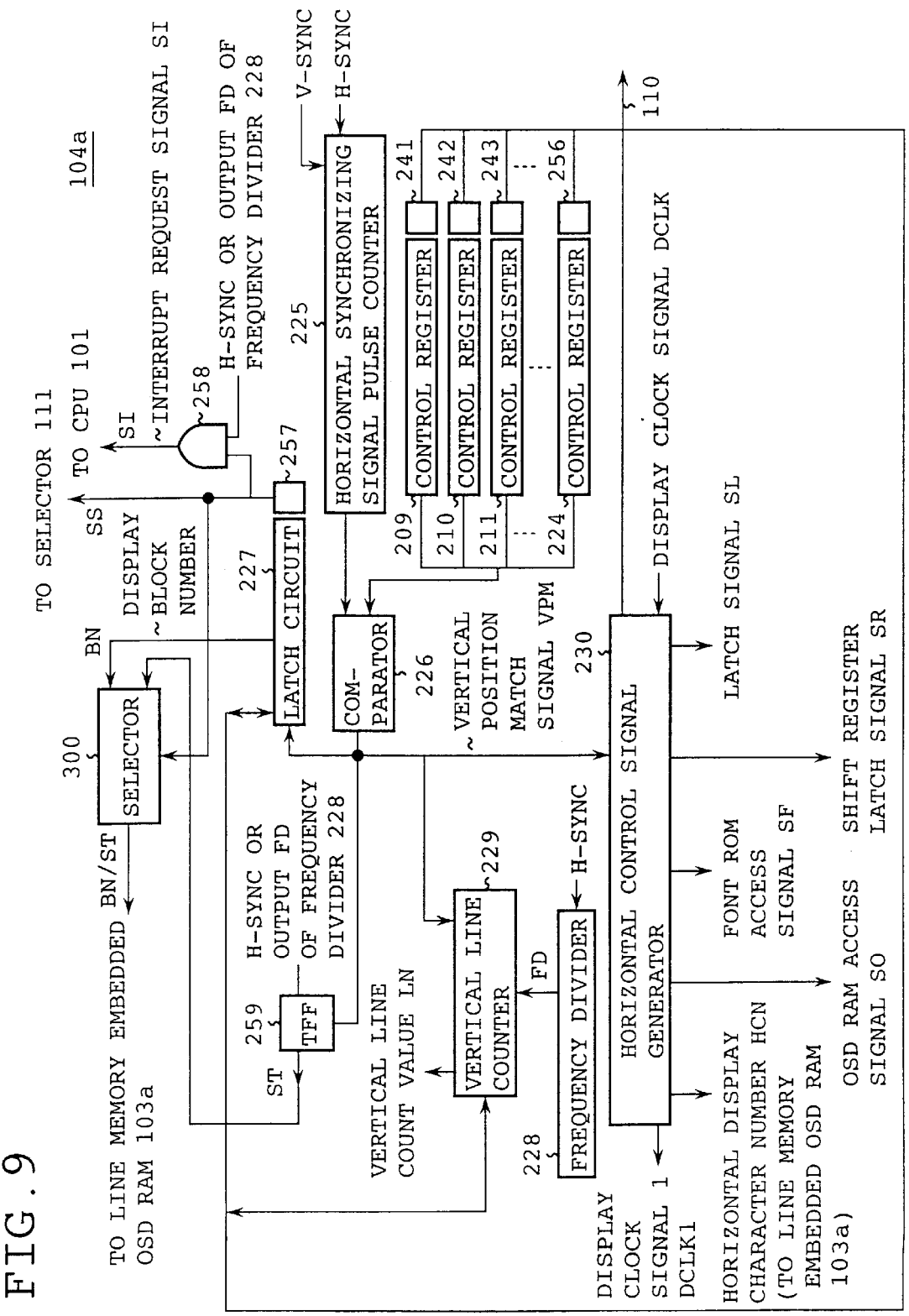
FIG. 9 is a block diagram showing a detailed configuration of a control signal generator 104a in FIG. 8.

FIG. 9 is a block diagram showing a detailed configuration of the control signal generator 104a, in which the same portions to those of FIG. 2 are designated by the same reference numerals and the description thereof it omitted here. In FIG. 9, the reference numeral 300 designates a selector for selecting either the display block number BN latched in the latch circuit 227 or the output signal ST of the toggle flip-flop 259 in accordance with the signal SS latched in the latch circuit 257, and for supplying the selected signal to the line memory embedded OSD RAM 103a. The address of the line memory embedded OSD RAM 103a is designated by the output signal ST of the selector 300 and the horizontal display character number HCN fed from the horizontal control signal generator 230 to the line memory embedded OSD RAM 103a. The OSD RAM access signal SO output from the horizontal control signal generator 230 serves as the access signal to the line memory embedded OSD RAM 103a.

Next, the operation of the present embodiment 2 will be described.

The selector 300 is switched in accordance with the value of the moving display ON/OFF bit SS latched in the latch circuit 257. Thus, the selector 300 produces the output ST of the toggle flip-flop 259 in the moving display mode, and the output BN of the latch circuit 227 in the moving display OFF mode. This enables the present embodiment 2 to carry out substantially the same operation as that of the embodiment 1. The memory portion in the line memory embedded OSD RAM 103a functioning as the line memory can store the character codes in the moving display OFF mode.

The present embodiment 2 has an advantage of implementing the moving display with hardware smaller than that of the embodiment 1 because the OSD RAM 103 and the line memory 100 are integrated into one memory.

Embodiment 3

In the foregoing embodiment 1, the latch circuits provided for controlling the selector 111, which selects the display data from the font ROM 102 or the line memory 100, correspond to the control registers. A bit for controlling the selector 111 can be provided for each character. In this case, the bits for controlling the selector 111 can be disposed (1) in the line memory 100; (2) in the OSD RAM 103; or (3) in a dedicated register provided for that purpose.

With one of the foregoing configurations, the selector 111 can be switched to select the display data from either the font ROM 102 or the line memory 100 on a character-by-character basis. This has an advantage of implementing a display of higher quality because the display data can be selected from one of the font ROM 102 and line memory 100 on the character-by-character basis.

Embodiment 4

Figure 10:
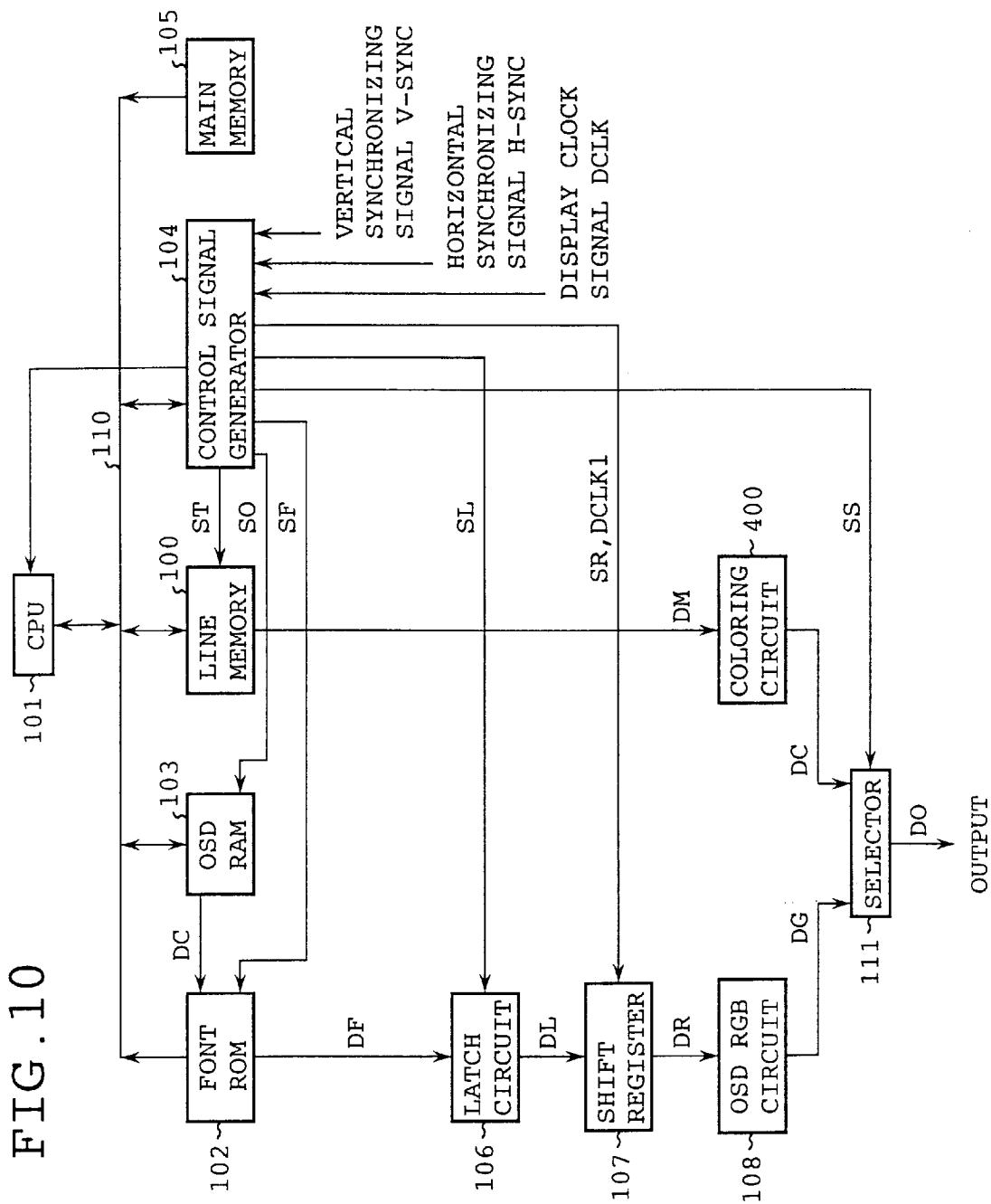
FIG. 10 is a block diagram showing a configuration of an embodiment 4 of the OSD unit in accordance with the present invention.
Figure 14:
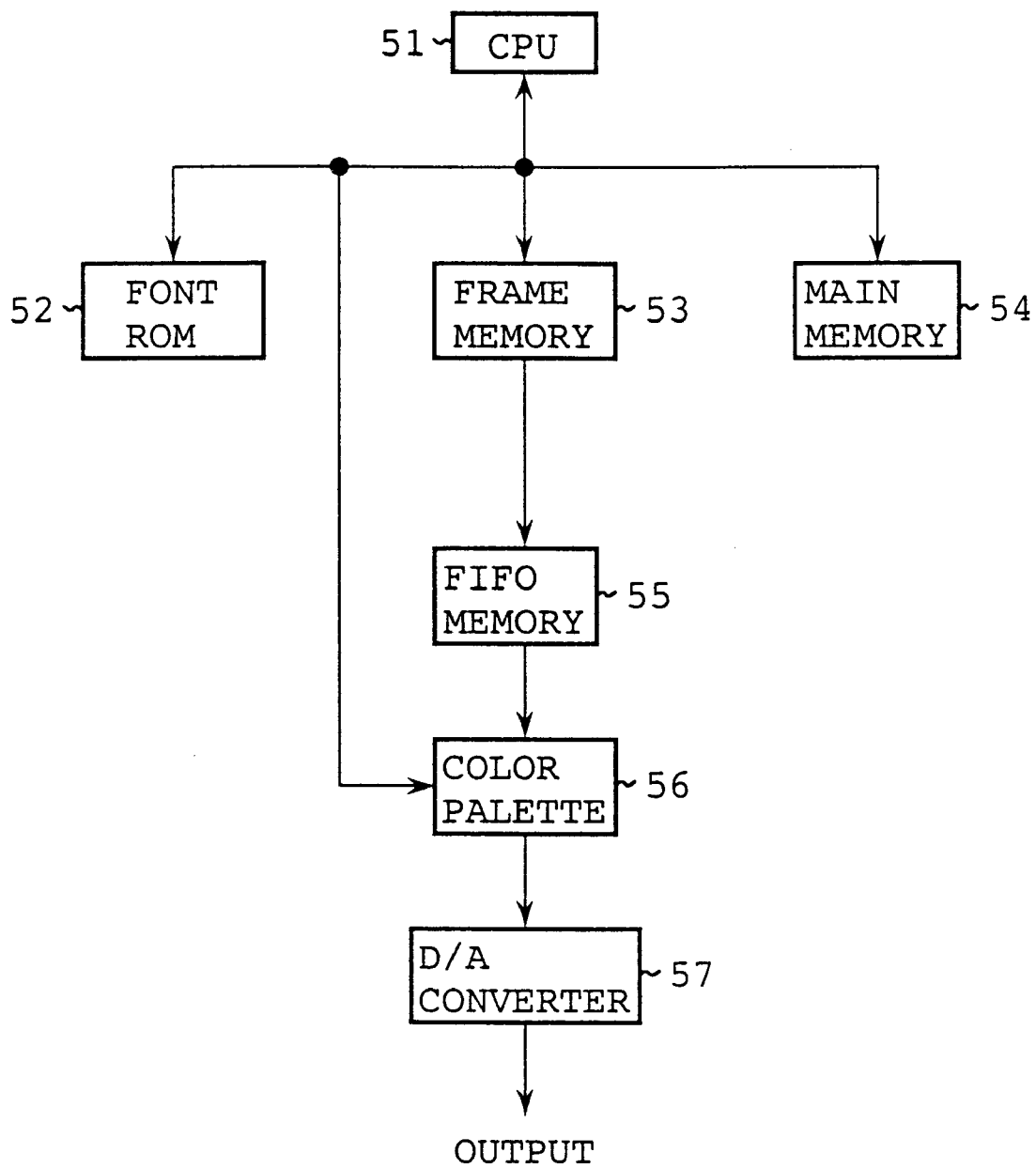
FIG. 14 is a block diagram showing a configuration of a conventional bitmapped OSD unit.

FIG. 10 is a block diagram showing an embodiment 4 of the OSD unit in accordance with the present invention, in which the reference numeral 400 designates a coloring circuit for applying color to image data. The coloring circuit 400 corresponds to the FIFO, color palette and D/A converter described in connection with FIG. 14. In FIG. 10, like portions to those of FIG. 1 are designated by the same reference numerals and the description thereof is omitted here.

Although the selector 111 for selecting the display contents is placed ahead of the outputs of the font ROM 102 and line memory 100 in the embodiment 1, it can be provided at the position as shown in FIG. 10. In FIG. 10, the selector 111 for selecting the data to be displayed is provided for selecting one of the outputs of the OSD RGB circuit 108 and coloring circuit 400.

Next, the operation of the present embodiment 4 will be described.

The coloring circuit 400 converts the output data of the line memory 100 into color data, and supplies the color data to the selector 111. The selector 111 selects one of the color data generated from the data in the line memory 100 and the color data generated from the data in the font ROM 102, in accordance with the control signal SS fed from the control signal generator 104, and outputs the selected color data.

Thus, the present embodiment 4 of the OSD unit can achieve the same effect as the embodiment 1.

Furthermore, the selector 111 for selecting the data to be displayed from the font ROM 102 or line memory 100 can be placed at a position other than the foregoing positions. In short, the selector 111 can be placed at any position between the output of the font ROM 102 and the OSD RGB circuit 108 to achieve the same effect. In addition, the selector 111 can be replaced by an OR circuit for OR-ing the two inputs. This makes possible various types of display.

What is claimed is:

1. An on-screen display unit for displaying static and moving images on a display screen, the on-screen display unit comprising:

a first memory for storing an image code of an image to be displayed on a display screen;

a second memory for generating font data of an image corresponding to the image code stored in said first memory, said second memory pre-storing font data of images to be displayed on the display screen;

a control signal generating circuit for generating a switching signal indicating one of a moving display ON mode and a moving display OFF mode;

a line memory for storing image data for at least one horizontal line of a moving image on the display screen;

image data generating means for generating image data to be stored in said line memory; and a selector for selecting output data from said second memory when the switching signal indicates the moving display OFF mode, and for selecting output data from said line memory when the switching signal indicates the moving display ON mode, wherein said on-screen display unit generates data to be displayed on the display screen based on an output of said selector.

2. The on-screen display unit as claimed in claim 1, wherein said line memory comprises two lines corresponding to two horizontal lines on the screen, and said image data generating means alternatingly writes generated data to one of the two lines.

3. The on-screen display unit as claimed in claim 1, wherein said first memory and said line memory are integrated into one common memory.

4. The on-screen display unit as claimed in claim 1, wherein said control signal generating circuit generates the switching signal on a block-by-block basis, a block being determined in advance as a display area on the display screen.

5. The on-screen display unit as claimed in claim 4, wherein said control signal generating circuit generates the switching signal on an image-by-image basis, an image being determined in advance as a display area in a block.

6. The on-screen display as claimed in claim 1, wherein said control signal generating circuit comprises an interrupt generating circuit for generating an interrupt supplied to said image data generating means in response to a horizontal synchronizing signal produced in a first area on the screen, and wherein said image data generating means, in response to the interrupt, reads display data corresponding to at least one subsequent horizontal scanning line, processes the display data, and stores processed data in said line memory.

7. The on-screen display unit as claimed in claim 6, wherein said control signal generating circuit generates control signals for controlling said first memory, said second memory, said line memory, said image data generating means, and said selector.

8. An image display method for an on-screen display unit including a first memory for pre-storing fonts of static images to be displayed on a display screen, a line memory for storing at least one horizontal line of a moving image to be displayed on the display screen, a selector for selecting one of output data from said first memory and output data from said line memory, and a central processing unit for control of the on-screen display unit, the image display method comprising:

in a moving display OFF mode, displaying static images on the display screen based on the font data stored in said first memory;

generating an interrupt and supplying the interrupt to said central processing unit in response to a horizontal synchronizing signal produced in a first area on said display screen;

switching said selector to select an output from said line memory in a moving display ON mode instead of an output from said first memory; and controlling said central processing unit to read display data corresponding to at least one subsequent horizontal scanning line, process the display data, and store processed data in said line memory in response to the interrupt.

* * * * *